Sept. 13, 1932.  V. G. APPLE  1,876,541

BRAKE MECHANISM

Filed Nov. 14, 1929  2 Sheets-Sheet 1

INVENTOR.
Vincent G. Apple
BY
ATTORNEYS

Sept. 13, 1932.　　　V. G. APPLE　　　1,876,541

BRAKE MECHANISM

Filed Nov. 14, 1929　　2 Sheets-Sheet 2

INVENTOR.
Vincent G. Apple
BY
ATTORNEYS

Patented Sept. 13, 1932

1,876,541

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

BRAKE MECHANISM    REISSUED

Application filed November 14, 1929. Serial No. 407,080.

My invention relates to brakes and has particular reference to an assembly designed for use on the front wheels of an automotive vehicle.

An object of my invention is to incorporate with a compact dirt and water proof assembly such as that disclosed in my copending application Serial Number 404,239, filed November 2, 1929, a mechanical means for operating the brake shoes whereby the brakes may be manually applied from a point outside the drum enclosure by the vehicle operator either independently of or in conjunction with the electric motor means.

A further object of my invention is to utilize an electric motor as a power brake applying means in such a way that the brakes will be positively retained in their applied position while the motor is inoperative and in this way substantially conserve the amount of current taken from a storage battery or the like for the purpose of applying the brakes, in conjunction with improved manual operating mechanism for applying the brakes independently of the power means and permitting independent operation by the power means, all as applied to a swivelled vehicle wheel.

Figure 1:
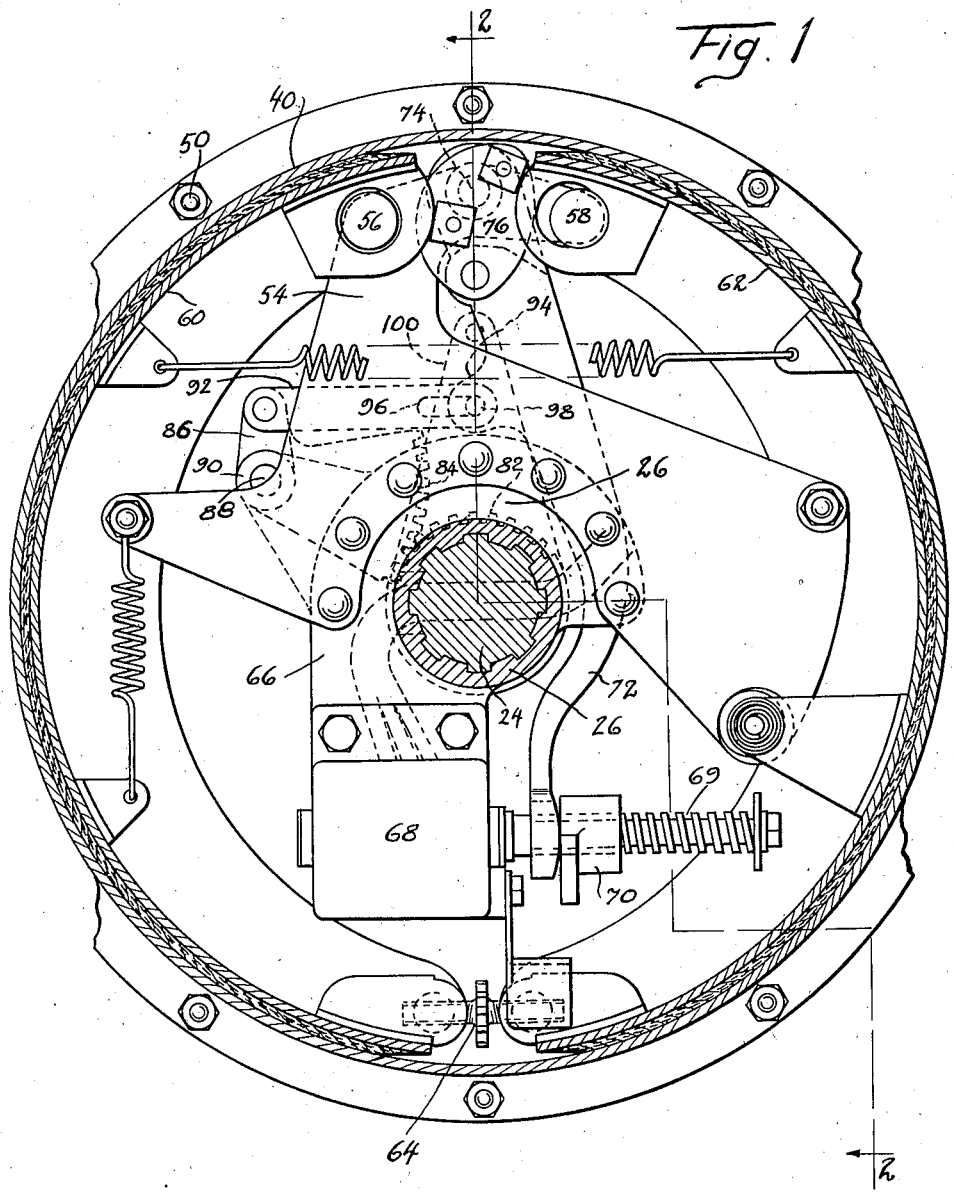
Figure 2:
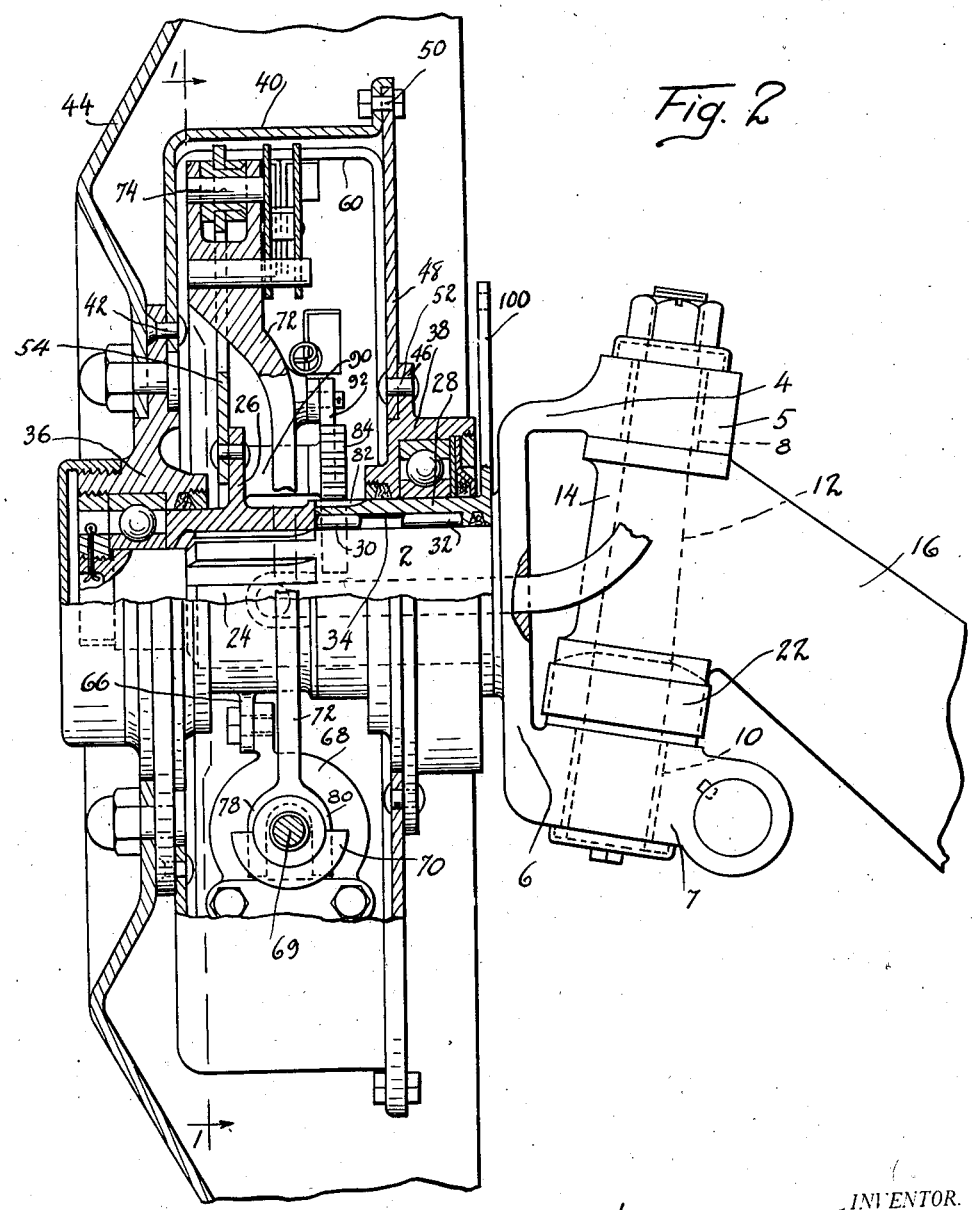

Further objects and meritorious features of my invention will appear from the following description, taken in conjunction with accompanying drawings, wherein like numerals refer to like parts throughout the several figures, and wherein:

Fig. 1 is a section of my power brake assembly taken on the line 1—1 of Fig. 2, and Fig. 2 is a sectional view on the line 2—2 of Fig. 1.

In the drawings the numeral 2 represents the usual steering spindle having radially extending arms 4 and 6 and carrying the hubs 5 and 7 for the bushings 8 and 10. The steering pivot pin 12 is secured in the hub 14 of the axle 16 and rotatably mounted in the bushings 8 and 10, with the anti-friction thrust bearing 22 under the hub 14 for the purpose of taking the vertical steering load.

On the outer end of the stub axle or spindle 24 is keyed the brake torque plate 26, and the sleeve 28 is rotatably journalled on the inner end thereof by means of the roller bearings 30 and 32, which are retained in spaced relation by means of the spacer 34. Secured to the outer and inner ends of the wheel and drum assembly are the bearing housings 36 and 38 respectively whereby the said assembly is rotatably journalled about the stub axle 24, bearing directly on the stub axle at its outer end and upon the sleeve 28 at its inner end.

The brake drum 40 is riveted as at 42 to the wheel 44. The inner bearing housing 38 is provided with a flange 46, and to this flange and the brake drum 40 is bolted the drum cover plate 48, as at 50 and 52. The brake torque plate 26 is provided with a plurality of radially extending arms, one of which, 54, is provided with the studs 56 and 58 which serve as anchors for the brake shoes 60 and 62 respectively. The other two adjacent ends of the brake shoes are connected by the right and left adjusting screw 64. Inasmuch as the expanding mechanism for the shoes and the contemplated power means for operating the same are to be mounted entirely within the closed drum, the brake shoes have been made channel shaped in cross section to provide room for the operating parts to be hereafter described.

Secured to a depending flange 66 of the torque plate 26 is the reversible electric motor 68 which is provided with a threaded extension 69 to its armature shaft. Mounted for axial sliding movement along this extension is the correspondingly threaded weighted runner 70.

On the arm 54 of the torque plate 26 is pivoted the brake operating arm 72, as at 74, and to this arm is pivoted the camming mechanism indicated generally at 76, since it is of conventional design.

The other extremity of the brake arm is bifurcated to form the two prongs 78 and 80 (see Fig. 1) which straddle the extension 69 of the motor armature shaft to swing axially therealong. The brakes have been illustrated in their "on" position, to which position they are moved when the motor is rotated in one direction and the axial movement of the runner 70 forces the brake arm 72 to swing to the left, thereby actuating the camming mechanism 76 to expand the brake shoes 60 and 62 against the internal periphery of the rotating brake drum 40. When the current through the motor is reversed, the armature shaft rotates in the opposite direction and the runner slides away to permit the return of the brake arm 72 to its "off" position through the operation of the customary return springs (not shown) acting through the medium of the camming mechanism 76.

With this power brake assembly I have included means for mechanically actuating the brake arm 72 independently of the electric motor means. For this purpose I have provided the outer end of the sleeve 28 with gear teeth 82 which are adapted to mesh with the gear teeth 84 on the sector lever 86. This sector lever 86 is pivoted at 88 in boss 90 which is formed on the brake torque plate 26. A link 92 connects the lever arm 86 of the gear sector 94 to the brake operating arm 72 through the medium of an elongated slot 96 in the link 92 which fits over a stud 98 in the said brake operating arm. In this way a slip joint between gear sector and the brake arm is provided whereby the said arm may be actuated by the gear sector either independently of or in conjunction with the power operating means and permits independent movement of the arm by the power operating means. A lever 100 is secured to the other end of the sleeve 28, preferably by welding it thereto, for the purpose of permitting actuation of the brake arm through the gear sector from a point outside the closed drum, and it is contemplated that this lever 100 will be connected through some mechanical linkage so that it may be actuated by the vehicle operator.

Having described one illustrative embodiment of my invention, various changes and modifications will be apparent to those skilled in the art, and for that reason I intend to limit myself only within the scope of the appended claims.

I claim:

1. Brake mechanism comprising a wheel spindle held against rotation by one end, an integral hollow drum closed at both ends rotatably supported thereon, internal expanding brake mechanism secured against rotation within the drum, electric motor means supported within the drum for expanding said brake mechanism, and mechanical means manually operable independently of the electric motor means for expanding the same.

2. Brake mechanism comprising a swivelled wheel spindle held against rotation by one end, an integral closed drum rotatably journalled thereon, radially expansible brake friction means secured against rotation within the drum, electric motor means supported within the drum for expanding the friction means, said motor means including means for retaining the friction means in applied position when the current is off, and mechanical means operable from a point outside the drum for independently expanding the friction means.

3. Brake mechanism comprising a swivelled wheel spindle, an integral closed brake drum rotatably journalled thereon, friction means at a reversible electric motor secured against rotation within the drum, means whereby rotation of the motor shaft in one direction applies the friction means and in the other permit their withdrawal, and mechanical means extending outside the drum for actuating the friction means independently of the motor.

4. Brake mechanism comprising a swivelled wheel spindle, an integral closed brake drum rotatably journalled thereon, friction means and a reversible electric motor secured against rotation within the drum, means whereby rotation of the motor shaft in one direction applies said friction means and in the other permits their withdrawal, said means including means for retaining the friction means in any intermediate position when the circuit through the motor is broken, and means manually operable from a point outside the drum for actuating the friction means independently of the electric motor.

5. Brake mechanism comprising a swivelled wheel spindle held against rotation by one end, a hub having radially extending arms keyed thereto, an integral closed brake drum rotatably journalled thereon, radially expansible friction means and a reversible electric motor supported within the drum by said arms, operative connections between the electric motor shaft and the friction means, and mechanical linkage coupled with said operative connections and extending to a point outside the drum whereby the friction means may be manually expanded independently of the electric motor.

6. Brake mechanism comprising a swivelled wheel spindle, a closed brake drum rotatably journalled thereon, a hub having arms extending radially within the drum keyed to said spindle, radially expansible friction shoes and a lever for expanding them supported on one of said arms, a reversible electric motor having a threaded extension to its armature shaft secured to another of the arms, said lever having a bifurcated portion straddling said threaded extension, means axially slidable on said extension upon rotation thereof to actuate the lever arm, a gear sector pivoted to said radially extending arm and having a lost motion connection with the lever arm, and a sleeve rotatably journalled on the spindle having gear teeth in mesh with the gear sector and operable from a point outside the closed drum.

7. Brake mechanism comprising a swivelled wheel spindle held against rotation at one end, a closed brake drum rotatably journalled thereon, radially expansible brake shoes and a pivoted lever for expanding them secured against rotation within the drum, a sleeve rotatably journalled on the spindle and extending from a point within to a point outside said drum, gear teeth on the inner end of said sleeve, a pivoted gear sector within the drum meshing with the said teeth and having a slotted connection with said lever, and means on the outer end of the sleeve whereby the same may be rotated to expand the brake shoes.

8. Brake mechanism comprising in combination a non-rotatable axle, a closed drum rotatably journalled thereon, expansible friction means secured against rotation within the drum, a sleeve rotatable about said axle, operative connections within the drum between said friction means and said sleeve, including a gear sector, and means operable from a point outside said drum for rotating said sleeve.

9. Brake mechanism comprising in combination a non-rotatable axle, a closed drum rotatably journalled thereon, expansible friction means and a lever arm for expanding the same supported against rotation within the drum, a sleeve rotatable about said axle from a point outside the drum, and a lost motion connection between said lever and sleeve whereby rotation of the latter actuates the friction means.

10. Brake mechanism comprising in combination a non-rotatable axle, a closed drum rotatably journalled thereon, expansible friction means and a lever for expanding the same supported against rotation within the drum, a sleeve rotatable about said axle from a point outside the drum and provided with gear teeth at its inner extremity, a gear sector pivoting within the drum, and meshing with said gear teeth, and a lost motion connection between said gear sector and lever.

In testimony whereof, I, VINCENT G. APPLE, sign this specification.

VINCENT G. APPLE.